Figure 1:
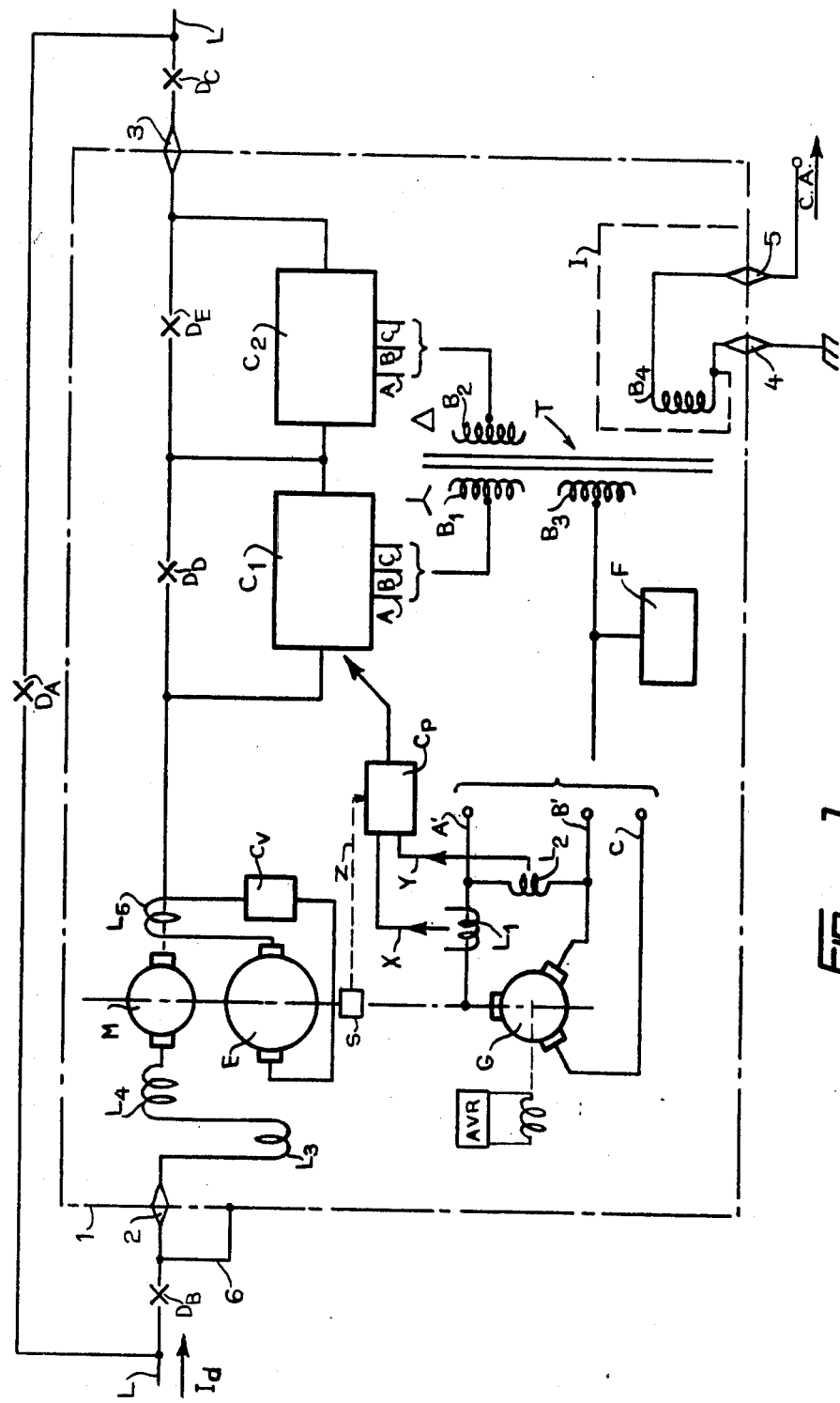

United States Patent [19]

Bowles

[11] 4,151,585
[45] Apr. 24, 1979

[54] SERIES TAPPING OF AN HVDC TRANSMISSION LINE

[75] Inventor: John P. Bowles, St-Bruno, Canada

[73] Assignee: Hydro-Quebec, West Montreal, Canada

[21] Appl. No.: 807,337

[22] Filed: Jun. 16, 1977

[51] Int. Cl.² .............................................. H02M 7/00
[52] U.S. Cl. ........................................ 363/35; 363/51; 363/79
[58] Field of Search ..................... 307/1, 4, 6; 363/35, 363/51, 65, 71, 79, 96

[56] References Cited

U.S. PATENT DOCUMENTS

| 3,477,010 | 11/1969 | Ve Nard | 363/65 X |
| 3,614,585 | 10/1971 | Wedin | 363/35 |
| 3,789,230 | 1/1974 | Paulange | 307/1 |

*Primary Examiner*—William M. Shoop

[57] ABSTRACT

A system for extracting and converting into complex power the electrical energy conveyed through a high voltage direct current (HVDC) transmission line, the system being serially mounted along that transmission line. The system comprises converter bridges to convert the transmission line high voltage into AC active power and a unit, connected to the line, for generating reactive power and feeding the latter through both the converter bridges and the load mounted across the system output. Moreover, there is provided a device for controlling the rate of extraction and conversion of the HVDC energy in function of the active power supplied by the generating unit. This control device ensures that the load requirements in active power are entirely supplied by the converter bridges alone. A voltage regulator is associated to the generating unit for the purpose of keeping constant the output voltages of that generating unit, thereby causing a nul output active power from the unit, in steady state. The tapping system is generally under a voltage proportional to the energy extracted on the transmission line whereas the metallic housing enclosing it is maintained at the transmission line voltage.

13 Claims, 2 Drawing Figures

SERIES TAPPING OF AN HVDC TRANSMISSION LINE

The present invention relates to a system for extracting the energy conveyed by a high voltage direct current (HVDC) transmission line and for converting that energy into alternating current energy to supply local networks. More particularly, the present invention concerns a system capable of extracting a given quantity of energy from an HVDC transmission line and to convert it into complex power, the system being serially mounted along the HVDC line.

By complex power, it is meant a power proportional to the sum of the active and reactive powers supplied to an electric load, as understood in the art.

In our knowledge, there presently exists no such system able to act as an intermediate station, along an HVDC line, to extract and to convert the energy conveyed by that line into complex energy readily usable by apparatus operating on AC power without the need of auxiliary supply sources.

Therefore, the present invention advocates a novel system which can be mounted in series with and along an HVDC line and which allows the extraction of a low or high portion of the DC energy and its conversion into AC voltage for local use, the elements constituting the instant system being under a voltage proportional to the power extracted from the transport line.

According to the present invention, the system is characterized in that it is connected in series with the HVDC transmission line and comprises means for extracting and converting the energy conveyed by that line into AC active power; means exclusively fed by said transmission line for generating and delivering reactive power to said extracting and converting means and to an electric load connected across the output terminals of the system; and control means connected to said extracting and converting means and to said generating means to ensure the supply of active power from said extracting and converting means alone.

Figure 2:
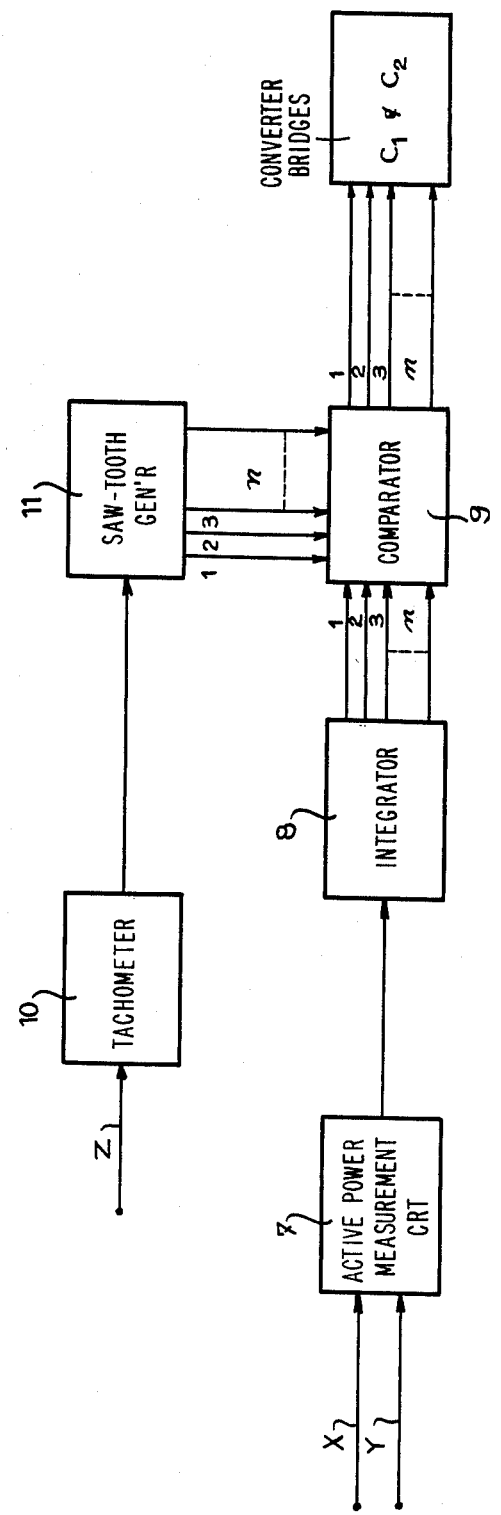

A preferred embodiment of the present invention will be hereinafter described with reference to the accompanying drawings, wherein FIG. 1 illustrates a tapping system mounted in series with an HVDC transmission line; and FIG. 2 schematically depicts a device for controlling converter bridges used in the system of FIG. 1.

Referring to FIG. 1, the complete tapping system is enclosed in a metallic housing 1 which is maintained at a voltage corresponding to the voltage of the HVDC line L by means of an electric conductor 6. The tapping system is directly inserted in series with the transmission line L by means of connectors 2 and 3 and its output delivers the AC voltage through the connectors 4 and 5, connector 4 being grounded. Accordingly, the installation of this tapping system is relatively easy and could therefore be set up properly in a relatively short period of time.

It should be noted that, depending on their closed or open position, the circuit breakers DA, DB and DC allow the direct supply of power to the tapping system or to short-circuit the latter. A continuous supply of HVDC current through the line L is thereby always insured, despite the removal of one or more serially mounted tapping systems.

The system itself may be divided into two main operational parts: the first part serving to extract energy from the transmission line L and to convert this energy into AC voltage, the second part including elements adapted to generate the reactive power necessary to ensure proper operation of the whole tapping system.

The converters $C_1$ and $C_2$, mounted in series, operate to extract a portion or the totality of the energy conveyed by the HVDC line and to convert it into active power. These converters are actually conventional converter bridges, generally of the Graetz type, which act as inverters and are formed of thyristors or mercury arc-lamps. The arrangement of the converters in the bridges $C_1$ and $C_2$ may be as described, for example, in the publication "Control Systems for H.V.D.C. Transmission" by J. P. Bowles, CEA, March 1971. The three-phase output voltages A, B and C supplied by the converters $C_1$ and $C_2$ feed respectively the starwindings $B_1$ and delta-windings $B_2$ of a transformer T, acting as a coupling circuit, and wherein the secondary winding $B_4$, of a star or delta connection, supplies the useful complex power.

In addition to the active power delivered to the load connected across the output of the system, there is provided a supply of reactive power which is generated by means of the generator G whose output three-phase voltages A', B', C' feed windings $B_3$ connected either in star or in delta in the transformer T. Generator G is mechanically driven by a DC motor M of the standard traction type, this motor M being mounted in series with the transmission line L. In steady state, the motor M rotates at a rated speed corresponding to 50 or 60 Hz, and this speed is accurately adjusted by means of an exciter E which is connected to a speed control circuit CV, in a well-known manner. Field inductances $L_3$, $L_4$ and $L_5$ maintain the motor speed constant, independently of variations in the intensity of the direct current flowing through the transmission line L. Moreover, the output voltages from the generator G are kept constant by an automatic voltage regulator AVR, thereby reducing to zero the active power from the generator.

In addition to supplying reactive power to the output load and to the converter bridges $C_1$ and $C_2$, generator G is also used to control the firing angle of the elements making up each of the converter bridges with a view to control accurately the proportion of power to be extracted from the transmission line L to meet the output load requirements. The CP circuit inputs X, Y and Z are respectively connected, on the one hand, to the current and voltage sensors $L_1$ and $L_2$ which provide a measure of the active power delivered by the generator, and, on the other hand, to the sensor S which measures the rotational speed of the generator. Thus, any increase or decrease in the active power requirements of the load will readily provoke a proportional variation in the firing angle of the converter bridges $C_1$ and $C_2$ via the power control circuit CP. This circuit CP is illustrated in FIG. 2 and will be described with more details later on.

It is important to note here that the instant tapping system works properly even if a single one of the converter bridges, either $C_1$ or $C_2$, is employed. In the arrangement shown, the use of two converter bridges is advocated for the sole purpose of reducing substantially the harmonics generated by the bridges. In any case, an harmonic filter F is connected to the output terminals of the generator to divert harmonics from the converter bridges away from the output load.

Concerning the generator G, it is emphasized that its function resides exclusively in delivering the reactive volts-amperes required by the output load and the converters. Therefore, in the event where more active power is required, due to an increase in demand by the output load, the control circuit CP, in response to the sensors $L_1$, $L_2$ and S, will cause adjustment of the firing angle of the converters to such an extent as to ensure that the active power required by the load is completely and solely provided from the converters, thereby reducing to zero the output active power from the generator G.

It is to be noted that the tapping system components are under a voltage which is proportional to the power extracted from the HVDC transmission line. A ground connection is provided only on the transformer secondary windings $B_4$ and an insulation screen I serves to protect windings $B_4$ from any impulse perturbations from the DC line.

For a 500 kV DC transmission line conveying a DC current of about 500 A, the tapping system, described above, could extract a power of about 7 MW. In this case, the potential drop across the converter bridges $C_1$ and $C_2$ is in the order of 14 kV, which is 7 kV per converter bridge. Therefore, due to the low voltage consumption, each converter bridge can be made of six serially mounted thyristors. Furthermore, the reactive power generated by the generator G is from about 3 to 4 Mvars when its winding operates at 4 kV, which is approximately half of the voltage drop at each converter. On the other hand, the DC traction motor M needs, in steady state, a power of approximately 10% of the system power in order to meet the acceleration requirements, which is about 0.4 MW at 500 A, i.e., a potential drop of 800 V across that motor. Under these conditions, the output power of the tapping system comes up to nearly 7 MW.

To put the tapping system in service, the breakers DB and DC are first closed, then the breakers DA is open. The DC line current is thereby diverted into the tapping system which appears initially as a short-circuit. The motor M accelerates to the rated speed (corresponding to 50 or 60 Hz) and is maintained at that speed by the exciter E provided with the speed control circuit CV. As soon as the speed of the generator G is synchronized with that of the driving motor M, the circuit-breakers DD and DE automatically open. The active power measurement circuit CP connected to the generator G reduces the generator output active power to zero through an appropriate adjustment of the firing angle of the inverter bridges. Breakers DD and DE being open, the DC line current passes through the converters $C_1$ and $C_2$ which deliver the active power required by the load while the generator G supplies the reactive power required by both the bridges and the load. As mentioned above, the system automatically responds to any variations in load requirements.

FIG. 2 schematically illustrates an embodiment of the control circuit CP of FIG. 1, which circuit serves to control the firing angle of the converters used in each of the converter bridges $C_1$ and $C_2$. As shown, the values X and Y provided from the sensors $L_1$ and $L_2$, respectively, are applied to a power measurement circuit 7, such as a wattmeter, the output of which provides a measure of the active power delivered by the generator. This power value is then integrated in integrator 8 comprising N outputs of equal values provided by means of a bus (not shown), the number of outputs actually corresponding to the number of converter elements used in the converter bridges $C_1$ and $C_2$. Where the number of converter elements is six per converter bridge, the integrator 8 will have six outputs. Then, the signals appearing at each of the six outputs of comparator 9 will be phase-displaced by 60° with respect to one another. On the other hand, a tachometer 10 measures the rotational speed Z of the shaft mechanically linking the motor M to the generator G. The resulting signals feed a sawtooth generator 11 which has the same number of outputs as integrator 8. The output signals from the integrator 8 and the generator 11 are thereafter compared by means of the comparator 9 which simultaneously delivers, if necessary, at each of its N outputs, a pulse corresponding to the difference between the output signal value from generator 11 and that from integrator 8. These pulses from the comparator 9 are applied simultaneously to all elements of the converter bridges $C_1$ and $C_2$ so as to correct the firing angle of each converter element, thereby varying the conversion rate of DC energy into AC energy in function of the load requirement. With the control circuit of FIG. 2, the firing angles of all converter elements are therefore automatically adjusted as a group according to the active power demand of the system output load.

It is to be noted that the above-described tapping system only comprises components which are readily available on the market, and hence of known characteristics, which results in an overall low manufacturing and installation cost system. Moreover, the use of the insulating screen I greatly enhances the insulation between the output $B_4$ and the other windings of the transformer T, which results in minimizing the effects due to perturbations, such as commutation faults or lightning strokes, on the transmission line onto the output of the system.

Moreover, it is to be noted that the reactive power of the system is entirely supplied by the motor-generator tandem which are solely fed in power by the transmission line and therefore no auxiliary power supply source is necessary to ensure proper operation of the system as a whole.

It is understood that modifications can be brought to the above-described tapping system without hampering the scope thereof, as for example, the installation of fans to blow out the heat generated by the motor-generator unit and by the converter bridges.

I claim:

1. A system for extracting and converting the electrical energy conveyed by a high voltage direct current transmission line for feeding a load with complex power, said system being inserted in series with said transmission line and comprising:
   means for extracting and converting said high voltage into AC active power;
   means, exclusively fed from said transmission line, for generating reactive power feeding said extracting and converting means and said load connected across the system output; and
   control means connected to said extracting and converting means and to said generating means to ensure a supply of said active power to the load from said extracting and converting means alone.

2. A system as claimed in claim 1, wherein said extracting and converting means comprise at least one inverter bridge and a coupling circuit for interconnecting said at least one inverter bridge, said reactive power generating means and said load.

3. A system as claimed in claim 2, comprising two inverter bridges serially connected, said bridges being respectively connected to said coupling circuit by means of a delta connection and a star connection, whereas said reactive power generating means are connected to the coupling circuit by either a delta connection or a star connection.

4. A system as claimed in claim 3, characterized in that the coupling circuit includes a secondary winding connected to the output load, and that said secondary winding is electrically insulated by means of a direct current insulation screen, one of the terminals of the secondary winding and the screen being grounded.

5. A system as claimed in claim 2, characterized in that said coupling circuit comprises a transformer.

6. A system as claimed in claim 1, characterized in that said reactive power generating means comprise a motor-generator unit.

7. A system as claimed in claim 6, characterized in that the motor of said unit is a direct current motor rotating at a constant speed and being mounted in series with said transmission line, said constant speed being ensured by means of an exciter unit connected to a speed control circuit.

8. A system as claimed in claim 6, wherein the generator of said unit comprises an automatic voltage regulator to maintain nul the active power normally generated by said generator.

9. A system as claimed in claim 6, characterized in that a circuit is provided to filter harmonics generated by said extracting and converting means, said circuit being inserted at the output of said generator.

10. A system as claimed in claim 1, characterized in that said reactive power generating means comprises a constant-speed motor generator unit and in that said control means comprises a circuit for comparing signals corresponding to the rotational speed of said motor generator unit and signal corresponding to power delivered by said generator, said comparing circuit delivering pulses for controlling the firing angles of all elements, as a group, forming said extracting and converting means.

11. A system as claimed in claim 10, characterized in that a circuit for measuring the output power of the generator is connected to an integrating circuit so as to feed said comparing circuit with said signal corresponding to said power.

12. A system as claimed in claim 10, characterized in that a tachometric device measures the rotational speed of the motor generator unit and is connected to a saw tooth generating circuit to supply said comparing circuit with said signal corresponding to said rotational speed.

13. A system as claimed in claim 1, characterized in that said system is enclosed in a metallic housing which is maintained at said transmission high voltage.

* * * * *